United States Patent
Jenkins

(10) Patent No.: US 11,561,988 B2
(45) Date of Patent: Jan. 24, 2023

(54) SYSTEMS AND METHODS FOR HARVESTING DATA ASSOCIATED WITH FRAUDULENT CONTENT IN A NETWORKED ENVIRONMENT

(71) Applicant: OpSec Online Limited, Washington (GB)

(72) Inventor: Mary V. Jenkins, Nampa, ID (US)

(73) Assignee: OpSec Online Limited, Washington (GB)

( * ) Notice: Subject to any disclaimer, the term of this patent is extended or adjusted under 35 U.S.C. 154(b) by 568 days.

(21) Appl. No.: 15/856,733

(22) Filed: Dec. 28, 2017

(65) Prior Publication Data

US 2018/0189359 A1 Jul. 5, 2018

Related U.S. Application Data

(60) Provisional application No. 62/440,798, filed on Dec. 30, 2016.

(51) Int. Cl.
```
G06F 16/2458    (2019.01)
G06N 20/00      (2019.01)
H04L 9/40       (2022.01)
H04L 67/52      (2022.01)
G06F 21/55      (2013.01)
G06F 3/0482     (2013.01)
```

(52) U.S. Cl.
CPC ........ *G06F 16/2465* (2019.01); *G06F 21/552* (2013.01); *G06N 20/00* (2019.01); *H04L 63/1408* (2013.01); *H04L 67/52* (2022.05); *G06F 3/0482* (2013.01)

(58) Field of Classification Search
None
See application file for complete search history.

(56) References Cited

U.S. PATENT DOCUMENTS

| | | | |
|---|---|---|---|
| 6,401,118 B1 * | 6/2002 | Thomas | G06F 21/10 |
| | | | 707/999.004 |
| 7,363,278 B2 * | 4/2008 | Schmelzer | G06F 21/10 |
| | | | 705/67 |
| 2003/0037010 A1 * | 2/2003 | Schmelzer | G06Q 50/184 |
| | | | 705/67 |
| 2003/0083961 A1 * | 5/2003 | Bezos | G06Q 30/0633 |
| | | | 705/26.8 |

(Continued)

FOREIGN PATENT DOCUMENTS

| | | |
|---|---|---|
| CN | 102129637 A | 7/2011 |
| JP | 2016524202 A | 8/2016 |

(Continued)

OTHER PUBLICATIONS

UPCbarcodes.com, "ASIN/GTIN Converter—UPC Barcodes:: UPC Barcodes", https://web.archive.org/web/20140606133405/https://www.upcbarcodes.com/dashboard/asin-gtin-converter/ (Jun. 6, 2014) (Year: 2014).*

(Continued)

*Primary Examiner* — Paul R Fisher
(74) *Attorney, Agent, or Firm* — McCarter & English, LLP

(57) ABSTRACT

Exemplary embodiments of the present disclosure relate to systems, methods, and non-transitory computer-readable media for harvesting, parsing, and analyzing item identifiers in networked content to identify fraudulent content.

29 Claims, 5 Drawing Sheets

(56) References Cited

U.S. PATENT DOCUMENTS

| | | | |
|---|---|---|---|
| 2003/0200155 A1* | 10/2003 | Ouchi | G06Q 30/0625 705/26.62 |
| 2004/0220903 A1* | 11/2004 | Shah | G06F 16/955 |
| 2006/0237534 A1* | 10/2006 | Junger | G07F 7/08 235/383 |
| 2007/0299777 A1 | 12/2007 | Shraim et al. | |
| 2008/0004981 A1* | 1/2008 | Gopalpur | G06Q 30/0635 705/26.81 |
| 2011/0238516 A1* | 9/2011 | McAfee | G06Q 30/0185 705/26.1 |
| 2013/0275434 A1* | 10/2013 | Platt | G06F 16/907 707/E17.014 |
| 2014/0040067 A1* | 2/2014 | England | G06Q 30/0282 705/26.7 |
| 2014/0081701 A1 | 3/2014 | Lakshminarayanan et al. | |
| 2014/0129288 A1* | 5/2014 | Eager | G06Q 30/0185 705/7.29 |
| 2014/0278804 A1* | 9/2014 | Lanxner | G06Q 30/0206 705/7.35 |
| 2014/0379604 A1* | 12/2014 | Bodenhamer | G06Q 10/083 705/330 |
| 2016/0055490 A1 | 2/2016 | Keren et al. | |
| 2016/0063611 A1* | 3/2016 | Davis | G06Q 30/0639 705/26.63 |
| 2016/0253679 A1 | 9/2016 | Venkatraman et al. | |
| 2016/0267620 A1 | 9/2016 | Calhoon et al. | |

FOREIGN PATENT DOCUMENTS

| | | | | |
|---|---|---|---|---|
| WO | WO0155886 A2 * | 8/2001 | | G06F 17/00 |
| WO | WO2012071543 A2 * | 5/2012 | | G06Q 30/00 |
| WO | 2014167516 A1 | 10/2014 | | |

OTHER PUBLICATIONS

PriceMinister: Counterfeit goods on the web: PriceMinister leads the way in europe. (Feb. 4, 2010). M2 Presswire Retrieved from https://dialog.proquest.com/professional/docview/444101829?accountid=131444 (Year: 2010).*

Supplementary European Search Report from related European Patent Application No. EP17886427 dated Jun. 29, 2020.

Karpischek, et al., Detecting incorrect product names in online sources for product master data, General Research—Institute of Information Management, Univeristy of St. Gallen, published Aug. 4, 2013.

Office Action from related Japanese Patent Application No. 2019-535764 dated Dec. 24, 2021.

* cited by examiner

SYSTEMS AND METHODS FOR HARVESTING DATA ASSOCIATED WITH FRAUDULENT CONTENT IN A NETWORKED ENVIRONMENT

RELATED APPLICATIONS

This application claims priority to U.S. Provisional Patent Application No. 62/440,798, filed on Dec. 30, 2016, which is hereby incorporated by reference in its entirety.

BACKGROUND

An overwhelming amount of digital content is accessible over networked environments, such as the Internet. This content spread across multiple data channels and/or sources, and more and more content is being made available daily. While most of this content is legitimate, some of the content is fraudulent or counterfeit.

SUMMARY

In accordance with embodiments of the present disclosure, a system for harvesting, parsing, and analyzing item identifiers in networked content to identify fraudulent content is provided. The system includes a computing system communicatively coupled to data sources in a networked environment. The data sources includes one or more remote servers that are configured to host content. The system also includes one or more local servers being disposed in the computing system. The one or more local servers are programmed to search the content hosted by the one or more remote servers in the networked environment based on at least one first item identifier. The one or more local servers are also programmed to receive a set of search results in response to searching the content, wherein each search result is associated with an item identified in the content. The one or more local servers are further programmed to harvest the set of search results from the data sources. The one or more local servers are also programmed to extract a plurality of item identifiers from each search result in the set of search results. The plurality of item identifiers including at least a GTIN and a brand name for each search result. The one or more local servers are further programmed to analyze, for each search result in the set of search results, whether the GTIN is legitimate or fraudulent based on the brand name. The one or more local servers are also programmed to tag each search result in the set of search results as legitimate or fraudulent based on the analysis.

In accordance with embodiments of the present embodiment, a method for harvesting, parsing, and analyzing item identifiers in networked content to identify fraudulent content is provided. The method is implemented using a computing system communicatively coupled to data sources in a networked environment, the data sources including one or more remote servers that are configured to host content, and one or more local servers being disposed in the computing system. The method includes searching, by the one or more local servers, the content hosted by the one or more remote servers in the networked environment based on at least one first item identifier. The method also includes receiving, by the one or more local servers, a set of search results in response to searching the content, wherein each search result is associated with an item identified in the content. The method further includes harvesting, by the one or more local servers, the set of search results from the data sources. The method also includes extracting, by the one or more local servers, a plurality of item identifiers from each search result in the set of search results. The plurality of item identifiers including at least a GTIN and a brand name for each search result. The method further includes analyzing, by the one or more local servers, for each search result in the set of search results, whether the GTIN is legitimate or fraudulent based on the brand name. The method also includes tagging, by the one or more local servers, each search result in the set of search results as legitimate or fraudulent based on the analysis.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

DETAILED DESCRIPTION

Figure 1:
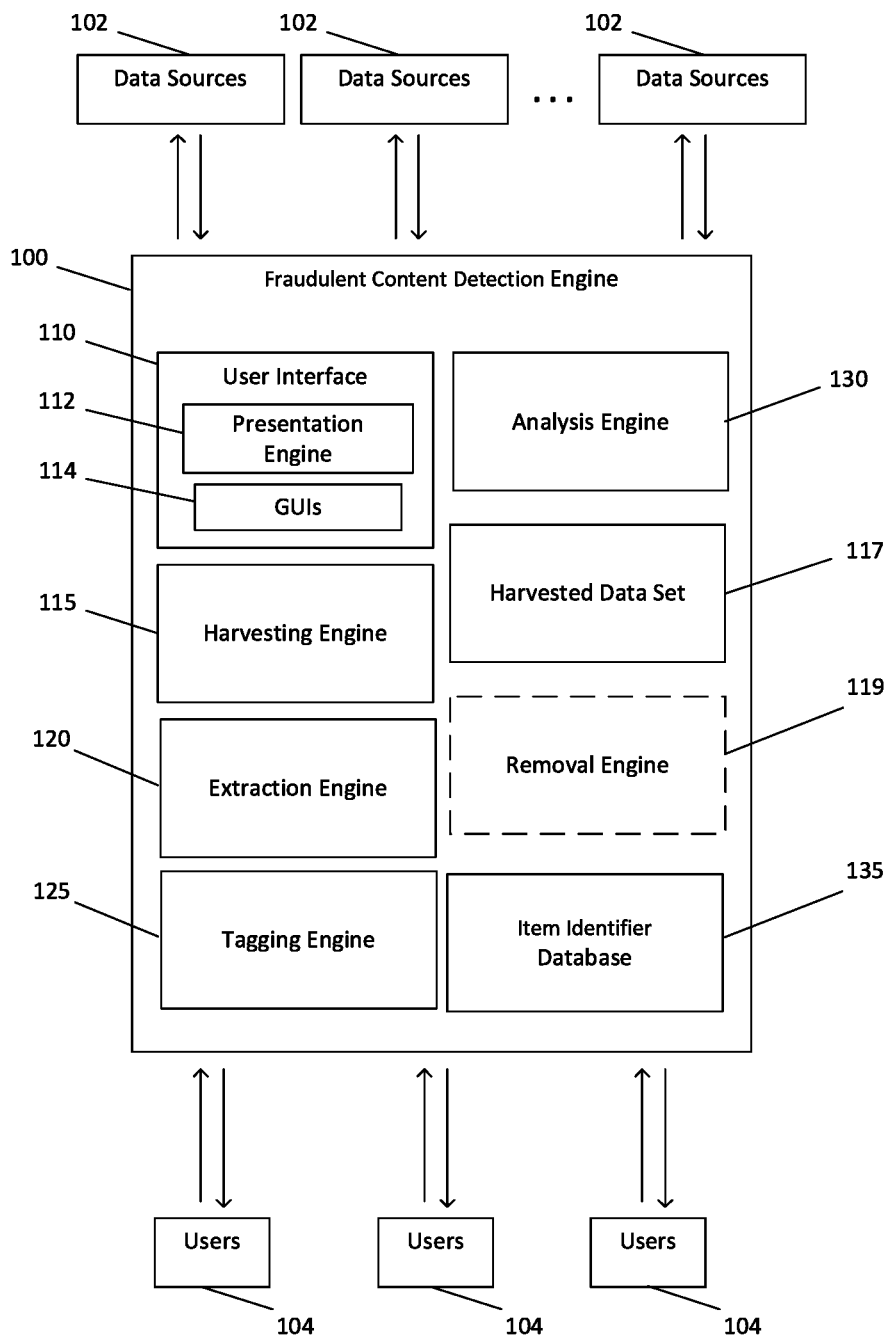
FIG. 1 is a block diagram of an exemplary fraudulent content detection engine for harvesting, parsing, analyzing, and facilitating the removal of fraudulent content from disparate data sources associated with various data channels in a networked environment in accordance with embodiments of the present disclosure.

Exemplary embodiments of the present disclosure relate to systems, methods, and non-transitory computer-readable media for harvesting, parsing, and analyzing item identifiers associated with items identified in digital content on networked environments to identify fraudulent content and ultimately for removing the fraudulent content from the networked environments. The systems and methods include a fraudulent content detection engine, including a harvesting engine, an extraction engine, a tagging engine, and an analysis engine. The fraudulent content detection engine can be communicatively coupled to data sources in the networked environments. The data sources can include one or more remote servers that are configured to host content. In one non-limiting application, the fraudulent content detection engine can be configured to search the networked environments to identify and remove fraudulent content for the purpose of brand protection.

In an exemplary embodiment, the harvesting engine is configured to harvest content from data sources in the networked environments. In particular, the harvesting engine searches for content in the data sources based on search terms and/or item identifiers. Item identifiers can include global trade item numbers (GTINs), including universal product codes (UPC codes), international standard book numbers (ISBNs), and European article numbers (EANs), brand names and model number combinations, and other standardized identifiers used by Internet search sites, online marketplaces, and/or online auction sites to standardize product listings. The GTIN is a globally unique number used to identify trade items, products, or services. The data sources include, but are not limited to, the Internet, marketplace/auction websites, including product listings. The harvesting engine searches for content using a direct search of search terms in the data sources and/or utilizing existing merchant site catalogue structures. For example, the harvesting engine may be configured to search a specific GTIN or keyword string in a plurality of product listings across one or more data sources. The harvesting engine can return a set or list of search results in response to searching the data sources. For example, the harvesting engine may return a list of webpages and/or products associated with the specific GTIN or keyword string.

The extraction engine extracts or parses item identifiers from each result in the set of results returned by the harvesting engine. The extraction engine creates a database entry or record for each result, wherein each item identifier extracted from a result corresponds to a field of the record. In an exemplary embodiment, each record includes at least an extracted GTIN and an extracted brand name parsed from the content. The extraction engine further extracts or parses any additional item identifiers included in each result and stores the additional item identifiers as fields in the database. Each item identifier is of a recognized item identifier category, which enables the extraction engine to categorize a parsed item identifier and insert it into a correct field. For example, the extraction engine is configured to categorize an extracted name as a brand name and insert the name into a field corresponding to brand names.

In some instances, the extraction engine may be unable to identify, recognize, and/or categorize one or more item identifiers from a result. As a non-limiting example, the extraction engine may not recognize or be able to categorize an European article number (EAN) listed in a result. In such an instance, an analyst may review the result and categorize the EAN as an EAN item identifier. Newly categorized item identifiers are stored with known item identifiers for use during future extractions.

For each record, the tagging engine determines whether the extracted GTIN is legitimate to the extracted brand name. In an exemplary embodiment, the tagging engine determines a legitimate brand name associated with the extracted GTIN by searching a GS1 company prefix included in the GTIN and/or searching the GTIN in a GS1 Global Electronic Party Information Registry (GEPIR) and/or searching the GTIN in an entity's database via the entity's application programming interface (API) and/or searching the GTIN in an independent database of brand GTINs. In some embodiments, the entity may be a company or business that owns and/or has an interest in the item associated with the GTIN. The GS1 company prefix is a digit number included in all registered UPC/EAN that identifies a brand. The GEPIR is a database configured to verify a barcodes/GTIN and/or a company name and/or brand. The tagging engine reviews the legitimate brand name against the extracted brand name, and tags each record as legitimate or fraudulent based on whether the extracted GTIN is legitimate to the extracted brand name.

The analysis engine further analyzes the item identifiers parsed from the results to identify and/or detect fraudulent network content. This step may be skipped where the tagging engine has already determined that the extracted GTIN is illegitimate to the extracted brand name. In an exemplary embodiment, the analysis engine tags each record as legitimate or fraudulent based on whether the extracted item identifiers corresponds with predefined item identifiers associated with the brand name. For example, the analysis engine may identify a mismatch between an extracted brand name and predefined brand identifiers. In another embodiment, the analysis engine tags each record as legitimate or fraudulent based on whether the analysis engine identifies and/or detects fraudulent characteristics in the item identifiers. Some examples of fraudulent characteristics can include misspelled words and misspelled brand names, incorrect stock keeping units (SKUs), or incorrect product descriptions.

In some embodiments, the fraudulent content detection engine further includes a removal engine to initiate an automated takedown of detected fraudulent content. Once a record is tagged as fraudulent, the removal engine autonomously initiates a takedown of the fraudulent content. For example, the removal engine may transmit a Digital Millennium Copyright Act (DMCA) notice to a content host or owner. The DMCA notice may include a predefined notice that includes inserted information associated with the fraudulent content or product(s). In another example, the removal engine communicates a takedown notice to the content host or owner via an application programming interface (API).

A non-limiting example of the system includes a fraudulent content detection engine in communication with a remote server hosting a webpage offering to sell a product that is counterfeit. For example, a GTIN listed on the webpage for the product may be associated with a brand "Apple" while a brand of the product shown on the webpage is "Samsung," resulting in brand confusion. The harvesting engine searches for content and harvests the webpage, typically as a result in a set of results. For example, the harvesting engine may download the HTML of the webpage to a database. The extraction engine parses item identifiers (i.e., the GTIN and the brand name) from the webpage, and the tagging engine determines that the GTIN is illegitimate to the brand name. The removal engine then transmits a takedown notice to a host of the webpage, identifying that the product offered on the webpage is fraudulent.

The methods and systems described herein enable efficient and effective aggregation of product information from Internet searches and electronic product catalogues for the purpose of brand protection. The system results in more complete, efficient data retrieval, and more actionable data to decrease the availability of fraudulent products. In this regard, exemplary embodiments of the present disclosure provide for an efficient and effective tool for harvesting a growing number of online marketplaces and webpages that may include fraudulent content and quickly removing the fraudulent content from these environments.

FIG. 1 is a block diagram of an exemplary fraudulent content detection engine 100 for harvesting, parsing, analyzing, and initiating the removal of fraudulent content from disparate data sources 102 associated with various data channels on the Internet or in any other networked environment in accordance with embodiments of the present disclosure. Engine 100 includes a user interface 110, a harvesting engine 115, an extraction engine 120, a tagging engine 125, and an analysis engine 130.

In an exemplary embodiment, harvesting engine 115 is configured to search online content for fraudulent content by crawling the web and/or the dark web, harvesting search engines and/or APIs to search webpages (including marketplace/auction webpages), searching mobile application data, and/or searching any other content in a networked environment. Harvesting engine 115 searches the content in the networked environment based on item identifiers, keyword strings or a combination thereof. For example, harvesting engine 115 may search webpage(s) in an online marketplace based on GTINs and/or search terms. In additional instances, harvesting engine 115 communicates with one or more data sources via an application programming interface (API).

In an exemplary embodiment, harvesting engine 115 can utilize GTINs of items included in Internet content to bring in viable product listings. This eliminates the failure to detect and harvest viable product listings due to keyword variations or title variations, resulting in more complete, efficient data retrieval. In an alternative embodiment, harvesting engine 115 generates or builds one or more queries (e.g., database, API, or web-based queries) based on the one or more search terms (e.g., key words) input by one or more users 104 via the one or more graphical user interfaces 114. As one example, harvesting engine 115 can build several queries from a single set of search terms, where each query can be specific to a search engine and/or application programming interface (API).

Harvesting engine 115 can be programmed to facilitate parallel searching of various data sources for like content. The queries can be generated or built using one or more query languages, such as Structured Query Language (SQL), Contextual Query Language (CQL), proprietary query languages, domain specific query languages and/or any other suitable query languages. In some embodiments, harvesting engine 115 can generate or build one or more queries using one or more programming languages or scripts, such as Java, C, C++, Perl, Ruby, and the like.

Harvesting engine 115 can execute each GTIN and/or key word query with search engines and/or APIs, which can return Internet content and/or any other content in a networked environment. For example, harvesting engine 115 may harvest a webpage (e.g., a product page) created for a good including pictures and other item identifiers about the good (e.g., GTIN, descriptions, specifications, dimensions, etc.).

As one example, execution of harvesting engine 115 can return one or more webpages from one or more Internet domains hosted by one or more web servers at one or more data sources. In some embodiments, the search results can be returned as a list and harvesting engine 115 can limit the quantity of results to be processed by engine 100. As a non-limiting example, harvesting engine 115 can select, e.g., the first one hundred webpages listed in the search results (or the first ten pages of search results) or any suitable quantity of results. The quantity of results selected for processing by engine 100 can be specified by engine 100 and/or by a user 104 of engine 100.

In the exemplary embodiment, the results returned via harvesting engine 115 are fetched and downloaded into a storage device and stored as a harvested data set 117. For example, each result (e.g., each webpage) can be stored as a file or other data structure. In some instances, one or more of the results can be stored in the same format as it is on the data source from which it is retrieved. For example, web pages may be stored in their native text-based mark-up languages (e.g., HTML and XHTML). In some instances, one or more of the results can be stored in a different format than the format in which it is stored on the data source from which it is retrieved.

At least one of the webpages returned via harvesting engine 115 can come from a website that utilizes a catalogue model. For example, harvesting engine 115 may search webpages of one or more marketplace websites that include listings of good/services available for purchase. Often such marketplace websites allow multiple third party sellers to sell the same good or service giving the buyer the ability to choose from which seller to buy the good or service. In such instances, some marketplace websites may include a separate webpage for each good/service (e.g., product) being offered for sale by each seller, while other marketplace websites can utilize the catalogue model.

One non-limiting example of an online marketplace that utilize a catalogue model is amazon.com from Amazon, where a product page (e.g., a webpage for a particular product sold on the Amazon marketplace) can identify numerous other sellers of the same product and/or can provide a link to a list of sellers selling the same product. In this example, each seller does not receive their own product page. Rather, the product page identifies a default seller, and to view other sellers of the product, a user must selected one or more links to a list of other sellers (e.g., a "new" link for sellers that sell the product as new, a "used" link for the sellers that sell the product as used, a "refurbished" link for the sellers that sell the product as refurbished). Harvesting engine 115 is configured to identify websites that use a catalogue model and fetch item identifiers for third-party sellers. For example, harvesting engine 115 can be programmed to use search engines or APIs to utilize an existing shopping site catalogue structure, such as utilizing Amazon's Product Advertising API, to search for product listings.

In some instances, a marketplace website may assign each GTIN available on the marketplace a separate unique marketplace specific identifier, which can be used by the marketplace website to uniquely identify a product on the marketplace website in place of a GTIN. The marketplace websites can incorporate these marketplace specific identifiers into their webpages and/or uniform resource locators (URL). An example of an online marketplace that utilize marketplace specific identifiers is amazon.com from Amazon, which uses an Amazon Standard Identification Number (ASIN) for a product. The ASIN is listed on the product page in the product details section and in the URL of the page itself. However, sellers are required to use an industry-standard item identifier, typically a GTIN, when creating new pages in the Amazon.com catalog. In one embodiment, harvesting engine 115 is configured to convert a GTIN to a marketplace specific identifier when targeting specific marketplaces that utilize marketplace specific identifiers. For example, in one embodiment, harvesting engine 115 is configured to include a marketplace specific identifier with additional query syntax to target specific webpages in a website (e.g., an online marketplace website).

Extraction engine 120 parses harvested data set 117 and extracts item identifiers from each result (e.g., each webpage and associated metadata) in harvested data set 117. In an exemplary embodiment, one or more of the results can include at least an extracted GTIN and an extracted brand name. As extraction engine 120 extracts the item identifiers from each result, extraction engine 120 builds an item identifier database 135 (e.g., a relational or NoSQL database) of the item identifiers. Extraction engine 120 adds records and associated item identifiers to the item identifier database 135. For example, extraction engine 120 creates a record for each result (e.g., each webpage) in harvested data set 117, and each item identifier extracted from a result can correspond to a field of the record. Each item identifier is of a item identifier category (i.e., brand name, product name, UPC, EAN, etc.), enabling the extraction engine to correctly categorize parsed item identifiers and insert them into correct fields.

The item identifiers extracted from the results includes information that may be useful in assessing whether each record corresponds to legitimate or fraudulent content. The item identifiers extracted from the results and stored into fields in item identifier database 135 can be, for example: text such as a product name, a product description, a seller name, GTIN or other item identifier(s), a geographic location of a seller, a geographic location to which a seller ships a product, seller reviews, and/or a title of the result (e.g., a title of the webpage); numbers such as a price, a quantity of a product available for purchase, product dimensions, and/or a marketplace-specific identifier; images, such as product images, logos, and/or artwork; other media, such as video and/or audio; a registrant name of the domain for a webpage; a name server that hosts the webpage; and raw data such as a HTML page source code, XML files, JavaScripts, and the like.

To extract the item identifiers from the results in harvested data set 117, extraction engine 120 can use, for example, natural language processing, machine learning, similarity measures, image matching techniques including pixel matching, and/or pattern matching techniques to identify item identifiers in the results. Extraction engine 120 can utilize one or more ontologies of entities to derive and/or identify entities (e.g., sellers) included in the results. Various algorithms and/or techniques can be utilized by extraction engine 120. For example, algorithms for fuzzy text pattern matching, such as Baeza-Yates-Gonnet can be used for single strings and fuzzy Aho-Corasick can be used multiple string matching; algorithms for supervised or unsupervised document classification techniques can be employed after transforming the text documents into numeric vectors: using multiple string fuzzy text pattern matching algorithms such as fuzzy Aho-Corasick; and using topic models such as Latent Dirichlet Allocation (LDA) and Hierarchical Dirichlet Processes (HDP).

In an alternative embodiment, rather than downloading content by harvesting engine 115 to create harvested data set 117, harvesting engine 115 identifies content (i.e., webpages) and extraction engine 120 parses item identifiers directly from the content. Extraction engine 120 creates item identifier database 135 using the item identifiers as described above.

Once the item identifiers have been extracted by extraction engine 120 and stored in item identifier database 135, tagging engine 125 determines for each record whether the extracted GTIN is legitimate to the extracted brand name. Tagging engine 125 determines a legitimate brand name associated with the GTIN via searching a GS1 company prefix included the GTIN and/or searching the GS1 Global Electronic Party Information Registry (GEPIR) and/or searching an entity's database via the entity's API and/or searching an independent database of brand GTIN. Tagging engine 125 tags each record as being legitimate or fraudulent based on whether the extracted GTIN is legitimate to the extracted brand name.

Analysis engine 130 reviews item identifiers related to the records in item identifier database 135 that have been identified as legitimate (e.g., based on the tagging of the records in item identifier database 135). For example, in response to tagging a record in item identifier database 135 as being legitimate (e.g., not counterfeit), exemplary embodiments of analysis engine 130 analyze the extracted and parsed item identifiers to determine whether each identifier corresponds with predefined and/or known item identifiers for that brand. As a non-limiting example, analysis engine 130 may analyze whether extracted product dimensions for the brand correspond with predefined and/or known product dimensions for the brand.

In an additional embodiment, analysis engine 130 analyzes the extracted item identifiers to identify suspicious content (e.g., fraudulent products). Product information listed on Internet search and shopping sites is often provided from data input or uploaded from sellers. In some known instances, sellers selling fraudulent or counterfeit products provide data that contains weak or incorrect item identifiers, for example, misspelled brand names and/or product names, incorrect quantity of a product, incorrect product dimensions, incorrect GTINs, wrong stock keeping units (SKUs), or incorrect or heavily misspelled product descriptions. In some embodiments, users 104 can interact with analysis engine 130 via the one or more graphical user interfaces 114 to control the implementation and parameters of the analysis. For example, user 104 may specify the predefined and/or known item identifiers for the records in item identifier database 135. In another embodiment, analysis engine 130 is configured to autonomously analyze the records of item identifier database 135. For example, analysis engine 130 can be configured to utilize one or more machine learning algorithms to analyze the records in item identifier database 135 to identify suspicious content, where the machine learning algorithm can be trained using a corpus of training data.

In some embodiments, a legitimacy tag option is associated with each record in item identifier database 135. Tagging engine 125 and analysis engine 130 can add a legitimate tag or a fraudulent tag to a record to indicate that the record (and therefore its associated webpage) corresponds to legitimate or fraudulent content.

In additional embodiments, a removal engine 119 initiates an automated takedown of detected fraudulent content and/or products. Once a result is tagged or determined as fraudulent, removal engine 119 initiates a takedown request of the fraudulent content. For example, removal engine 119 can generate a Digital Millennium Copyright Act (DMCA) notice by retrieving records from the harvested data set 117 and/or the item identifier database 135 to generate a structured file or e-mail. After the notice is generated, the removal engine 119 can transmit the notice to a content host or owner. In another example, removal engine 119 communicates a takedown notice to the content host or owner via an API.

In an exemplary embodiments, user interface 110 can generate the one or more graphical user interfaces (GUIs) 114 to include a list of the records from the searches, e.g., using views of item identifier database 135, where the records can be grouped in the one or more graphical user interfaces 114 based on one or more of the item identifiers extracted from harvested data set 117. As one non-limiting example, records associated with item identifier database 135 that has been tagged as fraudulent content are shown in graphical user interfaces 114.

User interface 110 includes a presentation/visualization engine 112 and one or more graphical user interfaces 114. Presentation engine 112 can be configured to provide an interface between one or more services and/or engines implemented in engine 100. Upon receipt of data, presentation engine 112 can be executed to generate the one or more of graphical user interfaces 114 and to render the data in the one or more graphical user interfaces 114. The one or more graphical user interfaces 114 can allow users 104 to interact with engine 100 and can include data output areas to display information to users 104 as well as data entry fields to receive information from users 104. Some examples of data output areas can include, but are not limited to text, graphics (e.g., graphs, maps—geographic or otherwise, images, and the like), and/or any other suitable data output areas. Some examples of data entry fields can include, but are not limited to text boxes, check boxes, buttons, drop-down menus, and/or any other suitable data entry fields.

User interface 110 may be generated by embodiments of engine 100 being executed by one or more local servers and/or one or more user computing devices. User interfaces 110 can be configured to render the item identifiers extracted from content (e.g., Internet content) as described herein and can be stored in records of item identifier database 135 as described herein, where a record is created for each result (e.g., webpage) resulting from a search of the content. User interfaces 110 can provide an interface through which users 104 can interact with the item identifiers extracted from the content. For example, user interfaces 110 can be configured to provide a structured arrangement of the item identifiers extracted from a webpage collected via harvesting engine 115 and extraction engine 120.

As a non-limiting example, user interfaces 110 can provide a list or table including an entry or row for records in item identifier database 135 and can populate the entry or row for a record with the item identifiers associated with the record. As another non-limiting example, user interfaces 110 can provide a two dimensional array or tiled arrangement including areas or tiles for records in item identifier database 135 and can populate each area or tile with the item identifiers associated with the records corresponding to the area or tile. As one non-limiting example, user interfaces 110 may include a list of entries for webpages collected via harvesting engine 115. For example, the rows can be associated with records in item identifier database 135 corresponding to webpages. Each row can include item identifiers extracted from a webpage and each column can include a category or a type of item identifier extracted from the webpage. For example, the item identifier category for the columns can include a title extracted from the webpage, an GTIN assigned to the product presented on the webpage, a price for the product presented on the webpage, a detection date indicating when the webpage was harvested by an embodiment of the fraudulent content detection engine, an entity name associated with the entity selling the product via the webpage, a geographic location associated with the entity selling the product via the webpage, a rating associated with the entity selling the product via the webpage, a geographic location to which the seller will ship the product presented on the webpage, and a domain/marketplace name that is hosting the webpage.

The rows and/or item identifiers in the rows can be selectable by user 104 to allow user 104 to interact with the list to modify the item identifiers and/or to perform one or more other actions. For example, if extraction engine 120 is unable to parse one or more item identifiers from a result, an analyst may review the result and enter one or more item identifiers into the row. The entered item identifier can then be used by the tagging engine 125 and analysis engine 130 in determining whether the product is legitimate or fraudulent.

Engine 100 may further include a re-harvesting frequency option to enable user 104 to specify the frequency with which harvesting engine 115 re-queries the content in the networked environment. For example, user 104 can specify that harvesting engine 115 searches ever, hour, every day, every week, every month, quarterly, and like.

Figure 2:
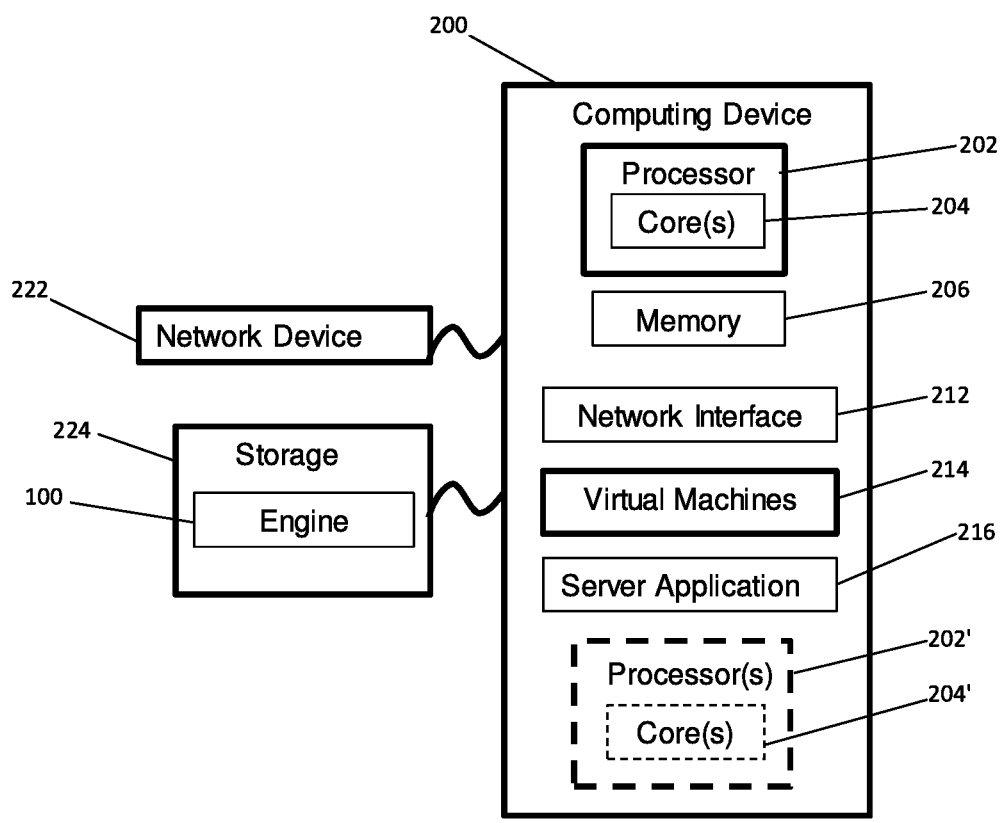
FIG. 2 is a block diagram of an exemplary computing device in accordance with embodiments of the present disclosure.

FIG. 2 is a block diagram of an exemplary computing device in accordance with embodiments of the present disclosure. In the present embodiment, computing device 200 is configured as a server that is programmed and/or configured to execute one of more of the operations and/or functions of engine 100 and to facilitate detection and removal of fraudulent content on the Internet or other networked environments. Computing device 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 206 included in computing device 200 may store computer-readable and computer-executable instructions or software for implementing exemplary embodiments of engine 100 or portions thereof.

Computing device 200 also includes configurable and/or programmable processor 202 and associated core 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in computing device 200 so that infrastructure and resources in the computing device may be shared dynamically. One or more virtual machines 214 may be provided to handle a process running on multiple processors so that the process appears to be using only one computing resource rather than multiple computing resources, and/or to allocate computing resources to perform functions and operations associated with engine 100. Multiple virtual machines may also be used with one processor or can be distributed across several processors.

Memory 206 may include a computer system memory or random access memory, such as DRAM, SRAM, EDO RAM, and the like. Memory 206 may include other types of memory as well, or combinations thereof.

Computing device 200 may also include one or more storage devices 224, such as a hard-drive, CD-ROM, mass storage flash drive, or other computer readable media, for storing data and computer-readable instructions and/or software that can be executed by the processing device 202 to implement exemplary embodiments of engine 100 described herein.

Computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing computing device 200 to any type of network capable of communication and performing the operations described herein. While computing device 200 depicted in FIG. 2 is implemented as a server, exemplary embodiments of computing device 200 can be any computer system, such as a workstation, desktop computer or other form of computing or telecommunications device that is capable of communication with other devices either by wireless communication or wired communication and that has sufficient processor power and memory capacity to perform the operations described herein.

Computing device 200 may run any server application 216, such as any of the versions of server applications including any Unix-based server applications, Linux-based server application, any proprietary server applications, or any other server applications capable of running on computing device 200 and performing the operations described herein. An example of a server application that can run on the computing device includes the Apache server application.

Figure 3:
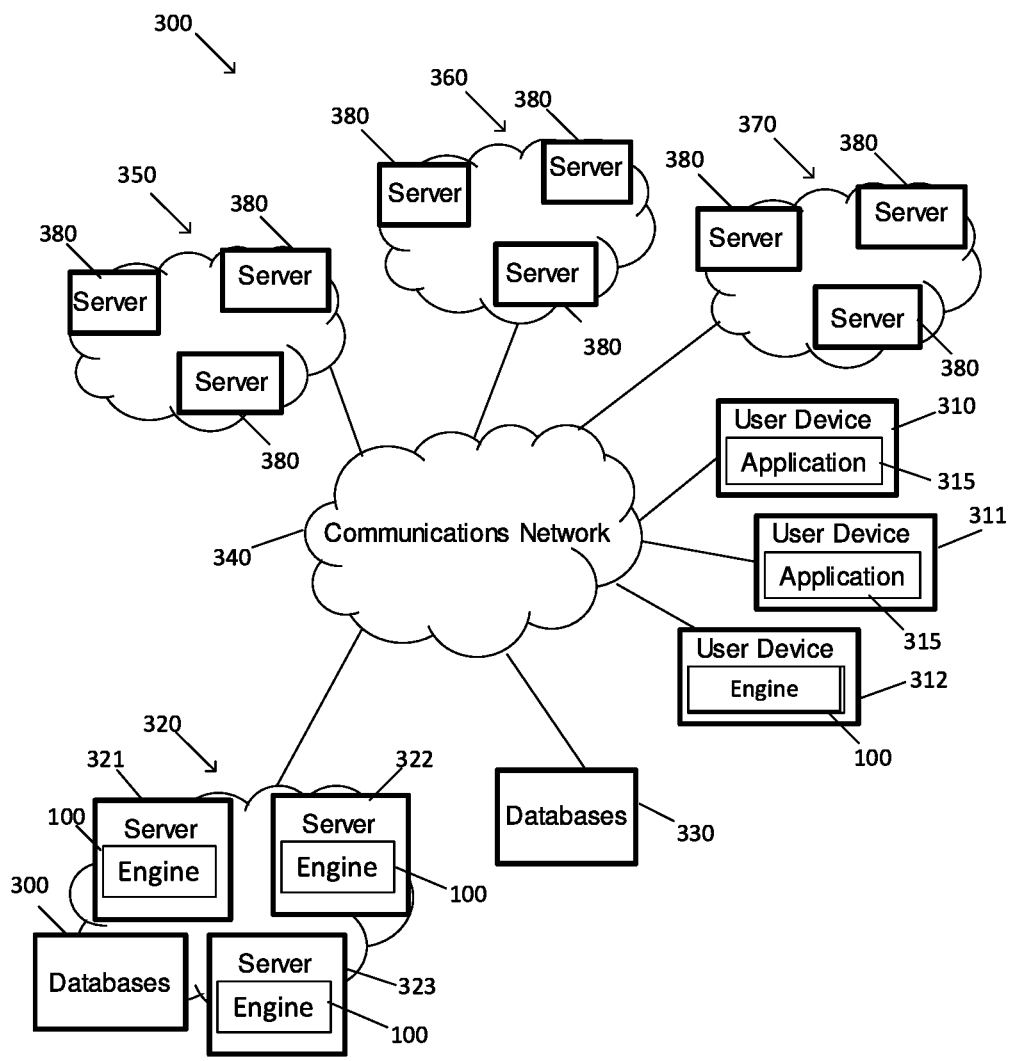
FIG. 3 is an exemplary networked environment for harvesting, parsing, analyzing, and facilitating the removal of fraudulent content on the Internet in accordance with embodiments of the present disclosure.

FIG. 3 is an exemplary networked environment 300 for facilitating detection and monitoring of fraudulent content on the Internet or other networked environments in accordance with embodiments of the present disclosure. Environment 300 includes user computing devices 310-312 operatively coupled to a remote computing system 320 including one or more (local) servers 321-323, via a communication network 340, which can be any network over which information can be transmitted between devices communicatively coupled to the network. For example, communication network 340 can be the Internet, an Intranet, virtual private network (VPN), wide area network (WAN), local area network (LAN), and the like. Environment 300 can include repositories or databases 330, which can be operatively coupled to servers 321-323, as well as to user computing devices 310-312, via the communications network 340. Those skilled in the art will recognize that the database 330 can be incorporated into one or more of servers 321-323 such that one or more of the servers can include databases. In an exemplary embodiment, embodiments of engine 100 can be implemented, independently or collectively, by one or more of servers 321-323, can be implemented one or more of the user computing devices (e.g., the user computing device 312), and/or can be distributed between servers 321-323 and the user computing devices.

User computing device 310-312 can be operated by users to facilitate interaction with engine 100 implemented by one or more of servers 321-323. In exemplary embodiments, the user computing devices (e.g., user computing device 310-311) can include a client side application 315 programmed and/or configured to interact with one or more of servers 321-323. In one embodiment, the client-side application 315 implemented by the user computing devices 310-311 can be a web-browser capable of navigating to one or more web pages hosting GUIs of engine 100. In some embodiments, the client-side application 315 implemented by one or more of user computing devices 310-311 can be an application specific to engine 100 to permit interaction with engine 100 implemented by the one or more servers (e.g., an application that provides user interfaces for interacting with servers 321, 322, and/or 323).

The one or more servers 321-323 (and/or the user computing device 312) can execute engine 100 to search for content available over the communications network 340. For example, engine 100 can be programmed to facilitate searching data sources 350, 360, and 370, which each can includes one or more (remote) servers 380 that are programmed to host content and make the content available over the communications network 340. As a non-limiting example, the servers 380 can be webservers configured to host websites that can be searched via one or more search engines and/or APIs using one or more queries generated by engine 100. For example, at least one of data sources 350, 360, and/or 370 can provide an online marketplace website.

Databases 330 can store information for use by engine 100. For example, databases 330 can store queries, extracted item identifiers data sets by engine 100, tags associated with engine 100, and/or any other suitable information/data that can be used by embodiments of engine 100, as described herein. Databases 330 can further store harvested data set (i.e., harvested data set 117) and/or include item identifier database (i.e., item identifier database 135).

Figure 4:
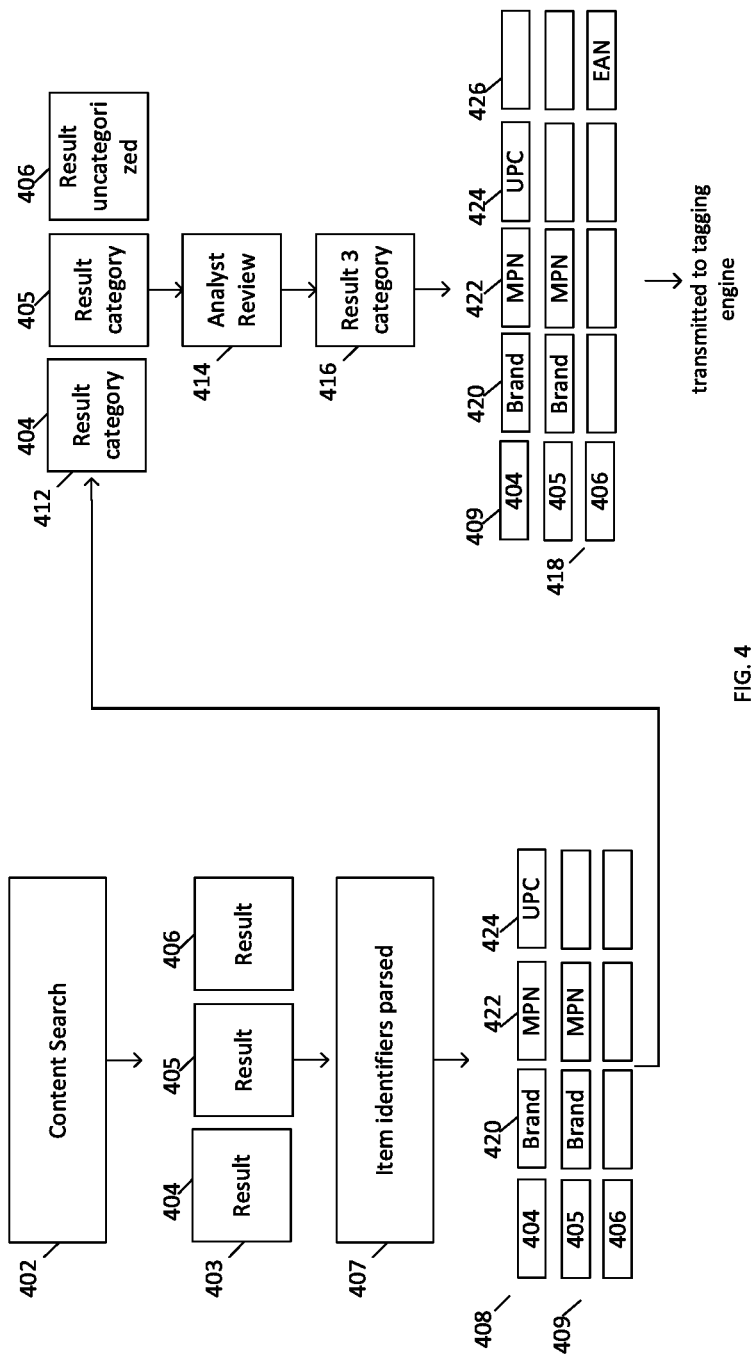
FIG. 4 is a flowchart illustrating an exemplary method for parsing and categorizing item identifiers associated items identified in network content using the fraudulent content detection engine in accordance with the present disclosure.

FIG. 4 is an exemplary method 400 for parsing and categorizing item identifiers using the fraudulent content detection engine implemented in accordance with embodiments of the present disclosure. At operation 402, a fraudulent content detection engine (i.e., engine 100) performs a content search on one or more data sources. At operation 403, the fraudulent content detection engine returns a plurality of search results in response to the content search. For simplicity, FIG. 4 shows only three returned results: result 404, result 405, and result 406. At operation 407, the fraudulent content detection engine extract or parses item identifiers from result 404, result 405, and result 406.

At operation 408, result 404, result 405, and result 406 are stored as records 409 into a database. Each item identifier is inserted into an appropriate data field according to its item identifier category. For example, the fraudulent content detection engine parses a brand name, a manufacturer part number (MPN), and a universal product code (UPC) from result 404, and a brand name and a MPN from result 405. The brand names are inserted in brand name data fields 420, the MPNs are inserted in MPN data fields 422, and the UPC is inserted in UPC data field 424. The fraudulent content detection engine fails to categorize any item identifiers for result 406.

At operation 412, fraudulent content detection engine tags result 406 with for review by an analyst. At operation 414, the analyst analyzes result 406 to categorize unknown item identifiers. At operation 416, the analyst identifies and categorizes an European article number (EAN) as an item identifier. At operation 416, the fraudulent content detection engine inserts the EAN in an EAN data field 426 associated with record 406. An EAN as an item identifier is stored with known item identifiers for future extractions. The results are then transmitted to the tagging engine for review, as described herein.

Figure 5:
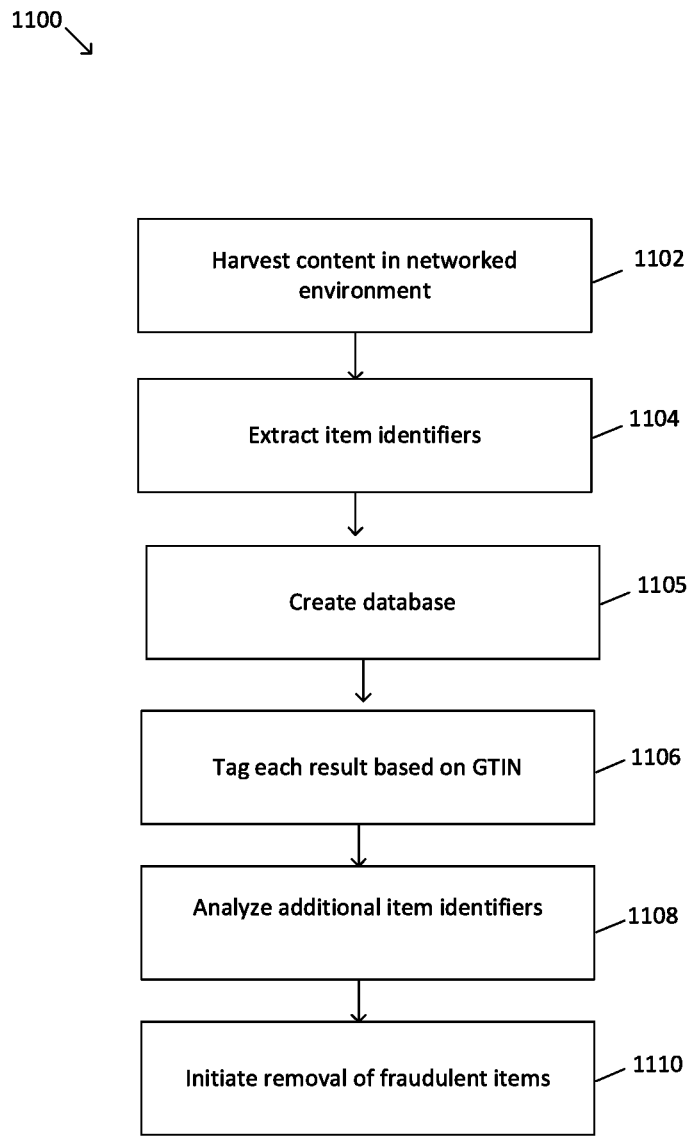
FIG. 5 is a flowchart illustrating an exemplary method for harvesting, parsing, analyzing, and facilitating the removal of fraudulent content in a networked environment in accordance with embodiments of the present disclosure.

FIG. 5 is a flowchart illustrating an exemplary process 1100 implemented via one or more local servers in a computing system implementing an embodiment of the fraudulent content detection engine (i.e., fraudulent content detection engine 100) in accordance with embodiments of the present disclosure. At step 1102, content (e.g., webpages) hosted by one or more remote servers in a networked environment is harvested, e.g., via a search implemented by the one or more local servers. The search can be based on a GTIN and/or one or more search terms. For example, the one or more local servers can use a GTIN as an input to at least one of a search engine or an application programming interface for searching content hosted by the one or more remote servers. Alternatively, the one or more local servers executing an embodiment of engine 100 can generate one or more queries based on the one or more search terms, and the one or more queries can form an input to at least one of a search engine or an application programming interface for searching content hosted by the one or more remote servers. Results from the search are fetched by the one or more local servers and downloaded into a storage device. In exemplary embodiments, the one or more remote servers can be webservers and the content hosted by the one or more servers can include websites that include webpages.

At step 1104, the one or more local servers extract item identifiers from each result (e.g., webpage) in a set of results returned in response to searching the content hosted by the remote one or more servers. In an exemplary embodiment, the extracted item identifiers includes a GTIN and a brand name. At step 1105, the one or more local servers creates a record in a database for each result (e.g., webpage) in response to extracting the item identifiers from the set of results. The item identifiers extracted from each result are stored in data fields associated with their respective records.

At step 1106, the one or more local servers tag each record as legitimate or fraudulent based on whether the extracted GTIN is legitimate to the extracted brand name. In an instance where one or more local servers searched for a specific GTIN, the one or more local servers tag each record as legitimate or fraudulent based on whether the specific GTIN is legitimate to the extracted brand name.

At step 1108, the one or more local servers analyzes the extracted and parsed item identifiers related to each record to further identify fraudulent products. In an exemplary embodiment, the one or more local servers determine whether one or more item identifiers corresponds with predefined item identifiers associated with the extracted brand name. In additional embodiments, the one or more local servers analyze the item identifier for weak or incorrect item identifiers. At step 1110, the one or more local servers initiate removal of any identified fraudulent or counterfeit products.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A method for harvesting, parsing, and analyzing item identifiers in networked content to identify fraudulent content, the method implemented via a computing system communicatively coupled to data sources in a networked environment, the data sources including one or more remote servers that are configured to host content, and one or more local servers being disposed in the computing system, the method comprising:
    building a query using one or more query languages, via a harvest engine, that converts an input GTIN into a unique marketplace specific identification number assigned by the online marketplace website and includes keywords to target a specific webpage in the online marketplace website including a product page that identifies a default seller of a product and links to a list of other sellers of the product in the online marketplace website, the online marketplace website hosted by the one or more remote servers in the networked environment;
    searching, by the one or more local servers using the query for the specific webpage in the online marketplace website;
    receiving, by the one or more local servers, a set of search results in response to searching the online marketplace website, wherein each search result is associated with the product page and the links to a list of other sellers;
    harvesting, by the one or more local servers, the set of search results from the data sources;
    parsing, by the one or more local servers executing an extraction engine, a plurality of item identifiers from each search result in the set of search results, the plurality of item identifiers including at least an extracted GTIN, an extracted brand name, an extracted stock keeping unit (SKU), an extracted product name, and an extracted description of the product for each search result, and storing in an identifier database;
    analyzing, by the one or more local servers, for each search result in the set of search results, whether:
        the extracted stock keeping unit (SKU), the extracted GTIN, and the extracted brand name are correct for the product,
        the extracted product name corresponds to a first product identified by the extracted GTIN,
        the extracted product name corresponds to the extracted brand name,
        the extracted description of the product corresponds to the first product identified by the extracted GTIN, and
        the extracted description of the product corresponds to the extracted brand name; and
    tagging, by the one or more local servers, each search result in the set of search results in the identifier database as legitimate or fraudulent based on the analysis.

2. The method of claim 1, further comprising analyzing, by the one or more local servers, whether the extracted GTIN is legitimate or fraudulent based on the brand name by at least one of searching a GS1 company prefix included in the extracted GTIN, searching a GS1 Global Electronic Party Information Registry, searching an entity's database via the entity's application programming interface (API), or searching an independent database of brand GTIN.

3. The method of claim 1, further comprising:
    determining, by the one or more local servers, for a first one of the search results, whether a corresponding one of the plurality of item identifiers corresponds with one or more predefined item identifiers associated with the brand name included in the first one of the search results; and tagging, by the one or more local servers, the first one of the search results as legitimate or fraudulent based on whether the corresponding one of the plurality of item identifiers corresponds with the one or more predefined item identifiers.

4. The method of claim 1, further comprising:
analyzing, by the one or more local servers, the plurality of item identifiers for each search result to identify incorrect item identifiers; and
tagging, by the one or more local servers, the search result as fraudulent in response to identifying the incorrect item identifiers.

5. The method of claim 1, further comprising harvesting, by the one or more local servers, product listings from the data sources through direct searching of websites and applications, query construction, and utilization of catalogue structures for the websites.

6. The method of claim 1, wherein the one or more remote servers in the networked environment are webservers.

7. The method of claim 1, further comprising initiating, by the one or more local servers, removal of the sellers associated with one or more results tagged as fraudulent.

8. The method of claim 1, further comprising:
creating, by the one or more local servers, a plurality of records in a database for the set of search results in response to extracting the plurality of item identifiers from each search result in the set of search results, each record of the plurality of records created in the database corresponding to a result in the set of search results; and
storing, by the one or more local servers, the plurality of item identifiers extracted from each result in a corresponding record of the plurality of records created in the database.

9. The method of claim 8, further implemented using a user interface, the method further comprising displaying on the user interface the plurality of records and the plurality of item identifiers.

10. A system for harvesting, parsing, and analyzing item identifiers in networked content to identify fraudulent content, the system comprising:
a computing system communicatively coupled to data sources in a networked environment, the data sources including one or more remote servers that are configured to host an online marketplace website;
one or more local servers being disposed in the computing system, the one or more local servers being programmed to:
build a query using one or more query languages, via a harvest engine, that converts an input GTIN into a unique marketplace specific identification number assigned by the online marketplace website and includes keywords to target a specific webpage in the online marketplace website including a product page that identifies a default seller of a product and links to a list of other sellers of the product in the online marketplace website, the online marketplace website hosted by the one or more remote servers in the networked environment;
search, using the query, the one or more remote servers in the networked environment for the specific webpage in the online marketplace website;
receive a set of search results in response to searching the online marketplace website, wherein each search result is associated with the product page and the links to the list of other sellers;
harvest the set of search results from the data sources;
parse, via an extraction engine, a plurality of item identifiers from each search result in the set of search results, the plurality of item identifiers including at least an extracted GTIN, an extracted brand name an extracted stock keeping unit (SKU), an extracted product name, and an extracted description of the product for each search result and store in an identifier database;
analyze, for each search result in the set of search results, whether:
the extracted stock keeping unit (SKU), the extracted GTIN, and the extracted brand name are correct for the product,
the extracted product name corresponds to a first product identified by the extracted GTIN,
the extracted product name corresponds to the extracted brand name,
the extracted description of the product corresponds to the first product identified by the extracted GTIN, and
the extracted description of the product corresponds to the extracted brand name; and
tag each search result in the set of search results in the identifier database as legitimate or fraudulent based on the analysis.

11. The system of claim 10, wherein the one or more local servers are further programmed to analyze whether the extracted GTIN is legitimate or fraudulent based on the brand name by at least one of searching a GS1 company prefix included in the extracted GTIN, searching a GS1 Global Electronic Party Information Registry, searching an entity's database via the entity's application programming interface (API), or searching an independent database of brand GTIN.

12. The system of claim 10, wherein the one or more local servers are further programmed to:
determine, for a first one of the search results, whether a corresponding one of the plurality of item identifiers corresponds with one or more predefined item identifiers associated with the brand name included in the first one of the search results; and
tag the first one of the search results as legitimate or fraudulent based on whether the corresponding one of the plurality of item identifiers corresponds with the one or more predefined item identifiers.

13. The system of claim 10, wherein the one or more local servers are further programmed to:
analyze the plurality of item identifiers for each search result to identify incorrect item identifiers; and
tag the search result as fraudulent in response to identifying the incorrect item identifiers.

14. The system of claim 10, wherein the one or more local servers are further programmed to harvest product listings from the data sources through direct searching of websites and applications, query construction, and utilization of catalogue structures for the websites.

15. The system of claim 10, wherein the one or more remote servers in the networked environment are webservers.

16. The system of claim 10, wherein the one or more local servers are further programmed to initiate removal of the sellers associated with one or more results tagged as fraudulent.

17. The system of claim 10, wherein the one or more local servers are further programmed to:
create a plurality of records in a database for the set of search results in response to extracting the plurality of item identifiers from each search result in the set of search results, each record of the plurality of records created in the database corresponding to a result in the set of search results; and store the plurality of item identifiers extracted from each result in a corresponding record of the plurality of records created in the database.

18. The system of claim 17, the system further comprising a user interface configured to display the plurality of records and the plurality of item identifiers.

19. The system of claim 10, wherein the one or more local servers are programmed to:
    autonomously generate, via a removal engine, a takedown request for at least one of the plurality of search results that is tagged as fraudulent; and
    communicate the takedown request to an owner of one of the data sources that hosts the content from the at least one of the plurality of search results.

20. The system of claim 10, wherein the one or more local servers being are programmed to build the query to search for a URL of the specific webpage in the online marketplace website based on the unique marketplace specific identification number.

21. The system of claim 10, wherein the product page identifies dimensions of the product, the one or more local servers being programmed to:
    parse, via the extraction engine, the dimensions of the product for each search result in the set of search results, and store the dimensions in the identifier database;
    analyze, for each search result in the set of search results, whether the extracted dimensions of the product match predefined correct dimensions of the product; and
    tag each search result in the set of search results in the identifier database as legitimate or fraudulent based on whether the extracted dimensions of the product match the predefined correct dimensions of the product.

22. A non-transitory computer-readable medium storing instructions for harvesting, parsing, and analyzing item identifiers in networked content to identify fraudulent content that when executed:
    build a query using one or more query languages, via a harvest engine, that converts an input GTIN into a unique marketplace specific identification number assigned by the online marketplace website and includes keywords to target a specific webpage in the online marketplace website including a product page that identifies a default seller of a product and links to a list of other sellers of the product in the online marketplace website, the online marketplace website hosted by the one or more remote servers in the networked environment;
    search, via one or more local servers using the query, the one or more remote servers in the networked environment for the specific webpage in the online marketplace website;
    receive, via the one or more local servers, a set of search results in response to searching the online marketplace website, wherein each search result is associated with the product page and the links to the list of other sellers;
    harvest, via the one or more local servers, the set of search results from the data sources;
    parse, via the one or more local servers executing an extraction engine, a plurality of item identifiers from each search result in the set of search results, the plurality of item identifiers including at least an extracted GTIN, an extracted brand name, an extracted stock keeping unit (SKU), an extracted product name, and an extracted description of the product for each search result, and store in an identifier database;
    analyze, via the one or more local servers, for each search result in the set of search results, whether:
        the extracted stock keeping unit (SKU), the extracted GTIN, and the extracted brand name are correct for the product,
        the extracted product name corresponds to a first product identified by the extracted GTIN,
        the extracted product name corresponds to the extracted brand name,
        the extracted description of the product corresponds to the first product identified by the extracted GTIN, and
        the extracted description of the product corresponds to the extracted brand name; and tag, via the one or more local servers, each search result in the set of search results in the identifier database as legitimate or fraudulent based on the analysis.

23. The non-transitory computer readable medium of claim 22, further storing instructions that when executed analyze, via the one or more local servers, whether the extracted GTIN is legitimate or fraudulent based on the brand name by at least one of searching a GS1 company prefix included in the extracted GTIN, searching a GS1 Global Electronic Party Information Registry, searching an entity's database via the entity's application programming interface (API), or searching an independent database of brand GTIN.

24. The non-transitory computer readable medium of claim 22, further storing instructions that when executed:
    determine, via the one or more local servers, for a first one of the search results, whether a corresponding one of the plurality of item identifiers corresponds with one or more predefined item identifiers associated with the brand name included in the first one of the search results; and
    tag, via the one or more local servers, the first one of the search results as legitimate or fraudulent based on whether the corresponding one of the plurality of item identifiers corresponds with the one or more predefined item identifiers.

25. The non-transitory computer readable medium of claim 22, further storing instructions that when executed:
    analyze, via the one or more local servers, the plurality of item identifiers for each search result to identify incorrect item identifiers; and
    tag, via the one or more local servers, the search result as fraudulent in response to identifying the incorrect item identifiers.

26. The non-transitory computer readable medium of claim 22, further storing instructions that when executed harvest, via the one or more local servers, product listings from the data sources through direct searching of websites and applications, query construction, and utilization of catalogue structures for the websites.

27. The non-transitory computer readable medium of claim 22, further storing instructions that when executed initiate, via the one or more local servers, removal of the sellers associated with one or more results tagged as fraudulent.

28. The non-transitory computer readable medium of claim 22, further storing instructions that when executed:
    create, via the one or more local servers, a plurality of records in a database for the set of search results in response to extracting the plurality of item identifiers from each search result in the set of search results, each record of the plurality of records created in the database corresponding to a result in the set of search results; and store, via the one or more local servers, the plurality of item identifiers extracted from each result in a corresponding record of the plurality of records created in the database.

29. The non-transitory computer readable medium of claim 28, further storing instructions that when executed display, on an user interface, the plurality of records and the plurality of item identifiers.

* * * * *